(12) United States Patent
Odinak

(10) Patent No.: US 9,514,329 B2
(45) Date of Patent: Dec. 6, 2016

(54) COMPUTER-IMPLEMENTED SYSTEM AND METHOD FOR INDIVIDUAL MESSAGE ENCRYPTION USING A UNIQUE KEY

(71) Applicant: Intellisist, Inc., Bellevue, WA (US)

(72) Inventor: Gilad Odinak, Bellevue, WA (US)

(73) Assignee: INTELLISIST, INC., Seattle, WA (US)

(*) Notice: Subject to any disclaimer, the term of this patent is extended or adjusted under 35 U.S.C. 154(b) by 376 days.

(21) Appl. No.: 13/853,972

(22) Filed: Mar. 29, 2013

(65) Prior Publication Data

US 2014/0129831 A1    May 8, 2014

Related U.S. Application Data

(60) Provisional application No. 61/618,582, filed on Mar. 30, 2012.

(51) Int. Cl.
*H04L 29/06* (2006.01)
*G06F 21/62* (2013.01)
*H04L 9/08* (2006.01)

(52) U.S. Cl.
CPC ......... *G06F 21/6227* (2013.01); *H04L 9/0861* (2013.01); *H04L 9/0866* (2013.01); *H04L 9/0869* (2013.01)

(58) Field of Classification Search
CPC .. G06F 21/6267; H04L 9/0861; H04L 9/0866; H04L 9/0869
USPC ........ 713/165, 168, 193; 380/283, 277, 268, 380/270
See application file for complete search history.

(56) References Cited

U.S. PATENT DOCUMENTS

| | | | |
|---|---|---|---|
| 5,136,648 A | 8/1992 | Olson et al. | |
| 6,369,727 B1* | 4/2002 | Vincze | G06J 1/00 341/131 |
| 6,529,602 B1* | 3/2003 | Walker et al. | 380/283 |
| 6,851,063 B1* | 2/2005 | Boyle | H04K 1/02 380/232 |
| 8,085,937 B1* | 12/2011 | Bradley, II | 380/282 |
| 8,190,917 B2* | 5/2012 | Nutter | 713/193 |
| 2004/0179690 A1* | 9/2004 | Soliman | H04L 9/12 380/277 |
| 2008/0052535 A1 | 2/2008 | Spohrer et al. | |
| 2008/0219449 A1* | 9/2008 | Ball | G06F 21/80 380/277 |
| 2009/0147960 A1* | 6/2009 | Maeda | G06F 21/10 380/277 |
| 2009/0185673 A1 | 7/2009 | Erhart et al. | |
| 2009/0245516 A1* | 10/2009 | Ravikiran | H04L 9/0869 380/268 |
| 2013/0339734 A1* | 12/2013 | Vernia | H04L 63/101 713/168 |

OTHER PUBLICATIONS

Yaoguoxiang et al., "Security Model Research and Design Based on Separate Storage of Keys", Industrial Mechatronics and Automation (ICIMA), 2010 2nd International Conference on, IEEE, Piscataway, NJ, USA, May 30, 2010, pp. 672-676, XP031725429, ISBN: 978-1-4244-7653-4.

* cited by examiner

*Primary Examiner* — Thuong Nguyen
(74) *Attorney, Agent, or Firm* — Patrick J. S. Inouye; Krista A. Wittman

(57) ABSTRACT

A computer-implemented system and method for individual record encryption is provided. A plurality of records associated with incoming calls to a call center are maintained. A unique encryption key is randomly generated for each record. The records are each encrypted using the encryption key generated for that record. The keys are stored in a location separate from the encrypted records.

18 Claims, 7 Drawing Sheets

60

COMPUTER-IMPLEMENTED SYSTEM AND METHOD FOR INDIVIDUAL MESSAGE ENCRYPTION USING A UNIQUE KEY

CROSS-REFERENCE TO RELATED APPLICATIONS

This non-provisional patent application claims priority under 35 U.S.C. §119(e) to U.S. provisional patent application Ser. No. 61/618,582, filed Mar. 30, 2012, the disclosure of which is incorporated by reference.

FIELD

The present invention relates in general to message-based voice communications and, in particular, to a computer-implemented system and method for individual message encryption using a unique key.

BACKGROUND

Typical call centers are expanding to provide communication with customers through various means, including through verbal communication over a telephone line, SMS text messaging, Instant Messaging, and email. During a communication session, agents and customers can correspond via one or more of the different communication means. These communication sessions are commonly recorded and stored as messages in a telephone call center for quality assurance and review purposes. Each session can include the divulgence of sensitive information, such as name, telephone number, address, social security number, and account number, which are stored as recorded messages.

To protect the sensitive information of customers, the message recordings of the communication sessions are encrypted via an encryption key for later use, if necessary. Generally, call centers use a master key to generate encryption keys, which are used to encrypt call center recordings. To prevent a key from being guessed or obtained by an unauthorized user, the key must be randomly generated and include sufficient entropy, or uncertainty. However, only a certain amount of randomness can be provided from a particular device to generate the keys. Also, extreme care must be taken in protecting the master key from which the encryption keys are generated. Therefore, the use of a single key for encrypting multiple records can result in a massive security breach. For example, if an unauthorized user obtains the key, the unauthorized user would have access to all the emails encrypted with that key.

Accordingly, a system and method to ensure maximum security of messages with sensitive information, while minimizing the extent of a possible security breach is needed. Preferably, the system and method will prevent unauthorized users from accessing a large amounts of data during a security breach by generating a unique encryption key for each record.

SUMMARY

To securely store recorded messages with sensitive information and minimize effects of a security breach, each message is separately encrypted with a different encryption key. Each call into a call center is recorded as a message. The message is compressed and subsequently encrypted with a unique encryption key. The encrypted message and the unique encryption key are then stored separately.

Still other embodiments will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
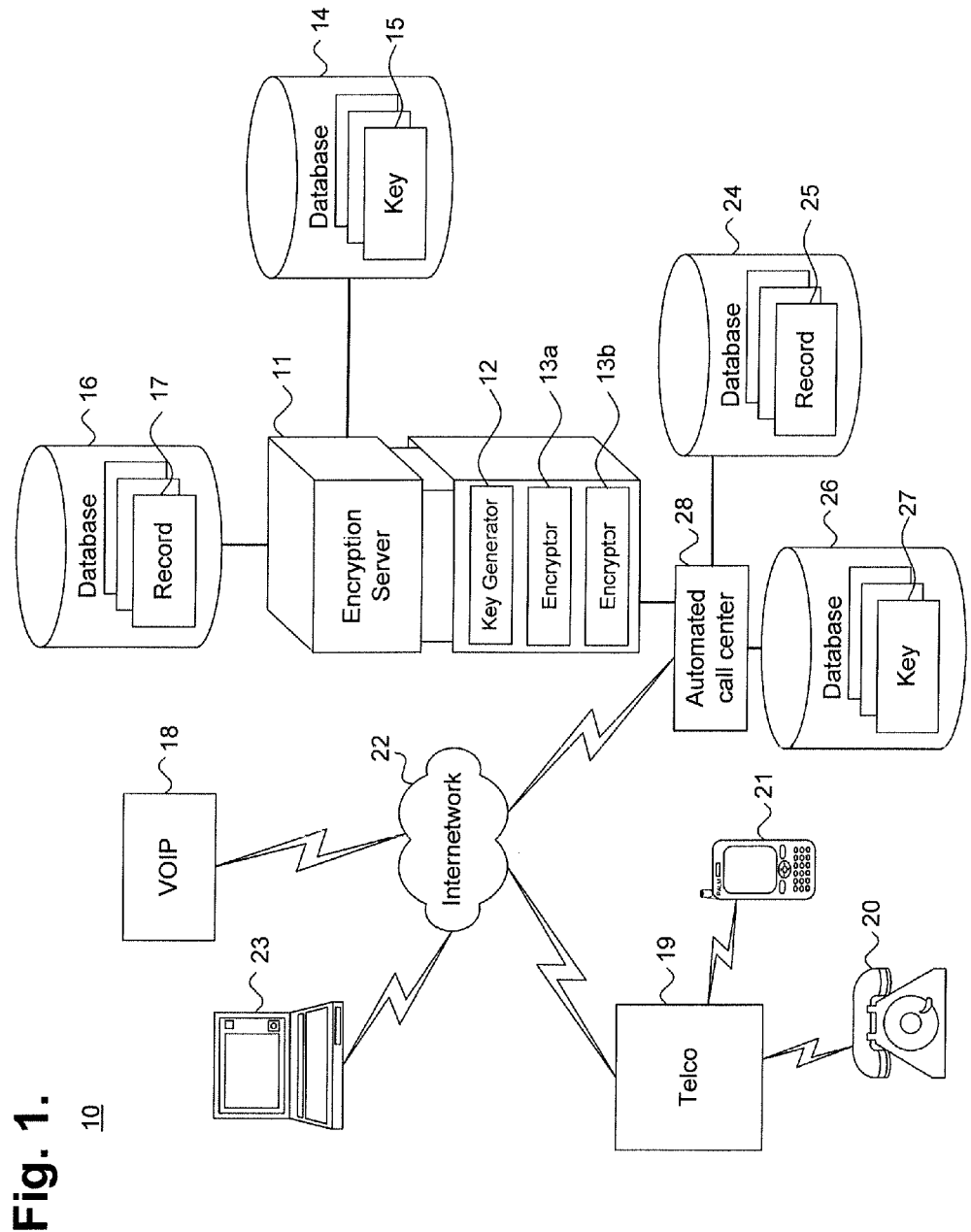
FIG. 1 is a block diagram showing a system for individual message encryption, in accordance with one embodiment.

Typically, call centers use public key encryption to protect sensitive information obtained during customer interactions. The customer interactions can be stored as messages, including voice recordings, text messages, email, and images. Generating unique keys for each message and subsequently, encrypting that message with a unique key provides additional security for a business and prevents occurrences of massive security breach. FIG. 1 is a block diagram showing a system for individual message encryption, in accordance with one embodiment. By way of example, a multiplicity of users call into an automated call center 28, such as through telephonic means. The telephonic means include Plain Old Telephone Service (POTS) 12, cellular and satellite telephones 13, Internet telephony (IPTel) 14, Voice over IP (VoIP) 15, and other forms of telephony and voice-based communications, as would be recognized by one skilled in the art. Users can also call or interface to the automated call center 28 through data transmission means, such as an internetwork 17, including the Internet. The data can be transmitted via text messages and emails. Additionally, the data can include images, which can be attached to the text messages and email. Content of the incoming calls can be recorded and stored as a message. The content can include voice, text, and images, as well as other types of content received during the incoming call. Voice content can be stored as voice recordings or text. In one embodiment, the content of each message is divided into predetermined size records. The size of the records can be equal lengths of time or different lengths.

Independent of call origination, each user call is routed through a telephone company (Telco) public interchange 16 or equivalent call center to the automated call center 28. Although shown with reference to a Telco public interchange 16, any other form of telephonic or equivalent call networking system transmitting voice or data signals over various signal carrier mediums, including conventional land lines; radio, satellite or other forms of signal carriers; light wave or sound wave exchange systems; or equivalents thereof, could also be utilized, as would be recognized by one skilled in the art.

The automated call center 28 provides a single source for support and problem resolution for users seeking direct assistance from manufacturers and service vendors, although automated call centers 11 can also be used in other areas of commerce, as would be recognized by one skilled in the art. The terms "user" and "customer" are used interchangeably herein and both refer to a caller to the automated call center 28. The call center 28 can include local databases 26, 26 for storing records 25 associated with the messages and encryption keys 27 to encrypt the records recording during the incoming calls.

Further, the automated call center 28 can be interconnected to an encryption server 11. The encryption server 11 includes a key generator and one or more encryptors 13a-b. The records and metadata (not shown) associated with a message, such as a counter and time are transmitted to the encryption server 11 for encryption. The key generator 12 generates an encryption key for each message based on the metadata using seed information from one or more devices. For example, entropy is gathered from one machine and entropy from a further machine is brought in to increase the randomness of the seed information used to generate the encryption key, as further described below with reference to FIG. 2. Key generation is further described below with reference to FIG. 4. Subsequently, the message is encrypted via one or more of the encryptors 13a-b using the encryption key. Specifically, each record of a single message is encrypted using the key. Once encrypted, the message and the encryption key are stored in separate databases to reduce the amount of security breach should the encryption key be obtained by an unauthorized user. Alternatively, the records 17 of the messages and encryption keys 15 can be stored in databases interconnected to the encryption server 11 or automated call center 28.

The encryption server 11 includes a key generator and one or more encryptors 13a-b. During encryption, each record and metadata (not shown) associated with the record, such as a record count and time are transmitted to the encryption server 11 via the internetwork 22. The key generator 12 generates an encryption key for the record based on the metadata using seed information from one or more devices. For example, entropy is gathered from one machine and entropy from a further machine is brought in to increase the randomness of the seed information used to generate the encryption key. Key generation is further described below with reference to FIG. 4. Subsequently, the record is encrypted via one or more of the encryptors 13a-b using the encryption key. Once encrypted, the record and the encryption key are stored in separate databases to reduce the amount of security breach should the encryption key be obtained by an unauthorized user.

Figure 2:
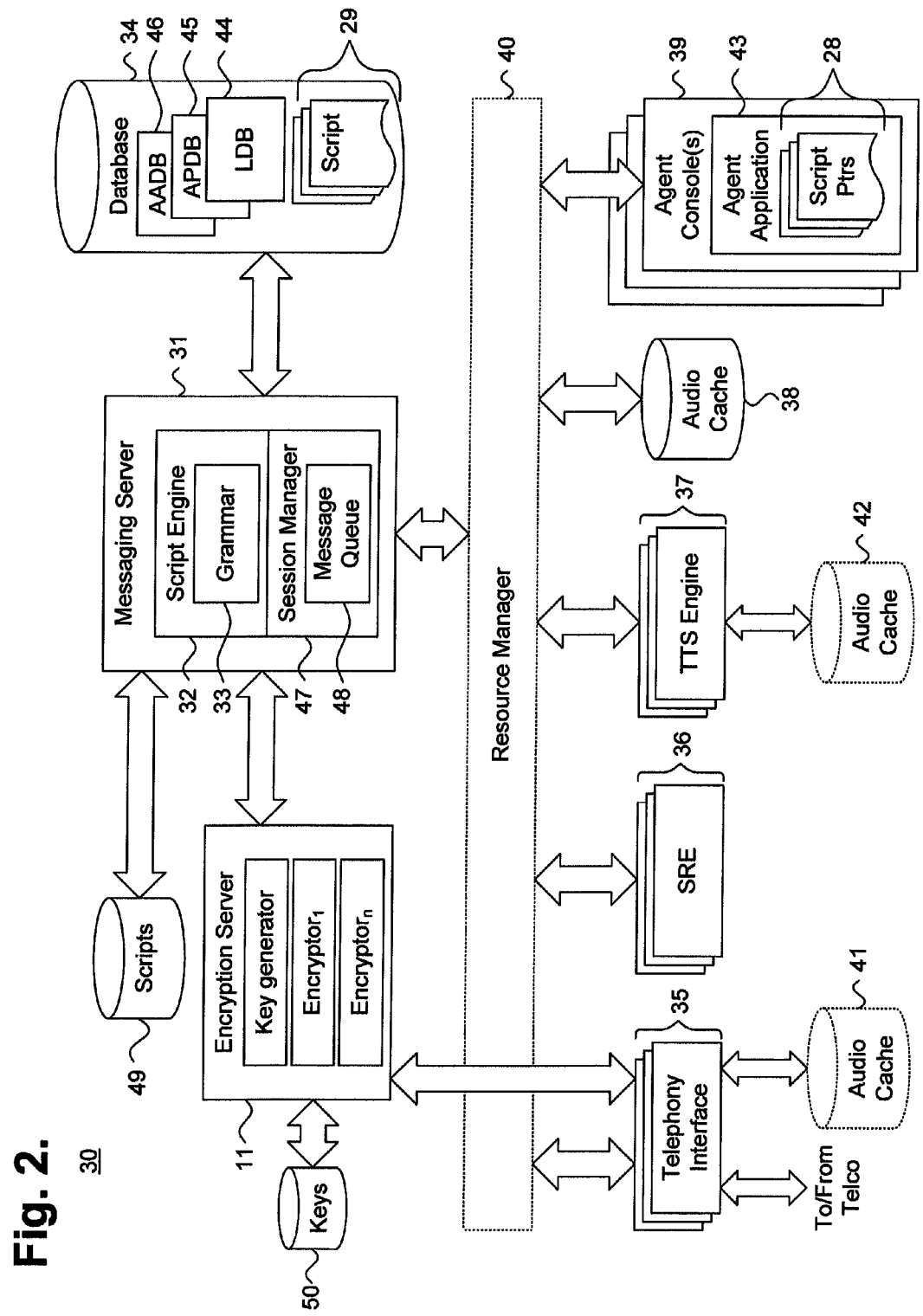
FIG. 2 is a block diagram showing, by way of example, a call center environment with the encryption server of FIG. 1.

In the call center environment, the encryption server is local to prevent unauthorized access to the recorded messages. FIG. 2 is a block diagram showing, by way of example, a call center environment with the encryption server of FIG. 1. During regular operation, the system 30 executes multiple threads to process multiple simultaneous calls, which are handled by one or more agents executing agent applications 43 on agent consoles 39 and can include voice, text, and image data, as described in commonly-assigned U.S. Pat. No. 7,292,689, issued on Nov. 6, 2007 and U.S. Pat. No. 8,068,595, issued on Nov. 29, 2011.

The system 30 includes the following components: database 34, telephony interface (TI) 35, one or more speech recognition engines (SREs) 36, one or more text-to-speech (TTS) engines 37, audio cache 38, one or more agent consoles 39, and optionally, resource manager 40. The messaging server 31, database 34, telephony interface 35, SREs 36, TTS engines 37 and audio cache 38 can execute on a single computer system while one or more agent consoles 39 can execute in parallel on separate computer systems. The messaging server 31 consists of a script engine 32 and session manager 47. The script engine 32 executes scripts 49 incorporating a grammar 33 that defines a set of executable instructions for specified and interactive question-and-response dialog, and a session manager 47 that includes a message queue 48 for staging transient user and agent messages. Script pointers ("Ptrs") 28 that identify the actual scripts 49 to be executed by the script engine 32 are maintained locally by each agent application 43. The scripts 49 are submitted by agents via an agent console 39 using the script pointers 28 during processing of customer calls. Each script 49 defines a sequence of synthesized speech utterances sent to customers and transcribed speech responses received back as user messages. The speech utterances could be pre-recorded and staged in the audio cache 38. The user messages are used to populate a form (not shown) that is reviewed by the agent during service provisioning. Alternatively, scripts 29 could be stored in the database 34 and the script pointers 28 would provide database pointers to the scripts 29.

The database 34 contains three primary specialized databases: log database (LDB) 44, agent profile database (APDB) 45, and agent application database (AADB) 46. The log database 44 provides a running journal as a structured log of each accepted call and stores each user message and agent message in a uniquely-identified record. Thus, agents are freed from the task of having to manually transcribe a telephone conversation following wrap-up. The agent profile database 45 allows the messaging server 31 to authenticate, log-on and sign-on agents into registered sessions. The agent application database 46 contains agent applications 43 that are executed on agent consoles 39. Optionally, the database 34 can also contain scripts 29. Other forms of specialized databases are possible, as would be recognized by one skilled in the art.

For each session, the messaging server 31 receives customer calls through the telephony interface 35 and sends a stream of transcribed speech utterances as user messages to an agent assigned to handle the session. During the call session, text, such as text messages and email, and images can also be received. Although both text messages and voice communications can simultaneously originate from the same customer, each might travel along a different path to the call center, depending upon the underlying telephone service. However, through a text message processor (not shown), the messaging server 31 can pair up separate streams of text messages and voice communications matching caller identification data to an on-going caller session, as described in commonly-assigned U.S. Pat. No. 8,068,595, issued on Nov. 29, 2011.

Similarly, the messaging server 31 receives a stream of synthesized speech utterances as agent messages from an assigned agent application 43 and sends the agent messages to the customer through the telephony interface 35. Text and images can also be sent to the user. The messages typically only contain digitized voice; however, Simultaneous Voice and Data (SVD), for example, Caller ID, can also be provided. The multiplexing and demultiplexing of SVD messages is handled at the telephony interface 35 and an agent console 39.

Specifically, the telephony interface 35 accepts and processes conventional telephone signals. Optionally, the telephony interface 35 includes an audio cache 41 in which pre-recorded "canned" sound bites are stored for efficient playback. These sound bites provide informational and navigational messages to all callers. User calls consist of ordinary spoken words, which must be transcribed into written text, for display, processing and storage. The purpose of the speech recognition engine 36 is to generate a stream of transcribed speech utterances that are recorded as computer-processable user messages.

Each caller into the system 30 can receive feedback in the form of agent messages, which each consist of a stream of synthesized speech utterances. The synthesized speech utterances include greetings, questions, informational responses, and other spoken phrases that the user hears during the course of the session. The purpose of the text-to-speech engine 37 is to generate the stream of synthesized speech utterances formed as agent messages, which can be played back as reproducible audio. Optionally, the text-to-speech engine 37 can include an audio cache 42 that stores pre-recorded "canned" sound bites, which provide efficient delivery of standardized synthesized speech utterances for use in scripts and repetitive agent actions. The system 30 sends agent messages for synthesis into speech. The synthesized speech is heard by the caller in the same manner as a live call through telephonic means transacted directly through the telephony interface 35.

Each agent console 39 provides the primary means for direct customer interaction. The primary purpose of each agent console 39 is to execute one or more agent applications 43, stored in the agent application database 46, which display both user and agent messages and provide menus of actions that can be executed responsive to agent commands, including script execution. Each agent application 43 receives a stream of transcribed speech utterances from the telephony interface 35 via the messaging server 31. In an alternate embodiment (not shown), the stream of transcribed speech utterances bypasses the messaging server 31 and is received directly from the telephony interface 35.

The messaging server 31 communicates with the speech recognition engine 36 to transcribe the utterances before sending the transcribed utterances to the agent application 43. In turn, the agent application 43 sends agent messages to the telephony interface 35 via the messaging server 31. The messaging server 31 communicates with the text-to-speech engine 37 to convert an agent message into a stream of synthesized speech utterances prior to forwarding to the telephony interface 35.

The caller and agent messages can be encrypted and stored for further use by agents of the call center. If the messages include a voice recording, a copy of the recording is made and digitally encoded prior to encryption. However, if the messages include text or an image, the text or image itself can be encrypted. The encryption server 11 encrypts the messages using a unique key 50 and can be interconnected to the messaging server 31 or the telephony interface 35. Speech utterances received through the telephony interface 35 can be directly transmitted to the encryption server 11 for encryption, while the transcribed speech utterances, text messages, emails, and images can be transmitted to the encryption server 11 via the messaging server 31 for encryption.

Prior to encryption, each message can divided into two or more records of predetermined length. The length of the records can be determined automatically or by an agent of the call center. Each record can be individually encrypted using a unique encryption key 50 associated with the message to increase security of the message and reduce any security breach that may occur due to unauthorized access. The encryption keys 50 can be stored in a database separate from the messages. Encryption of a message is further discussed below in detail with reference to FIG. 3 and encryption of the individual records for that message is further described below in detail with reference to FIG. 5.

The individual computer systems, including system 30, are general purpose, programmed digital computing devices consisting of a central processing unit (CPU), random access memory (RAM), non-volatile secondary storage, such as a hard drive, network interfaces, and peripheral devices, including user interfacing means, such as a keyboard and display. Program code, including software programs, and data are loaded into the RAM for execution and processing by the CPU and results are generated for display, output, transmittal, or storage.

Each component is implemented as a computer program, procedure or module written as source code in a conventional programming language, such as the C++ programming language, and is presented for execution by the CPU as object or byte code, as is known in the art. Alternatively, the components could also be implemented in hardware, either as integrated circuitry or burned into read-only memory components. The various implementations of the source code and object and byte codes can be held on a computer-readable storage medium or embodied on a transmission medium in a carrier wave.

Figure 3:
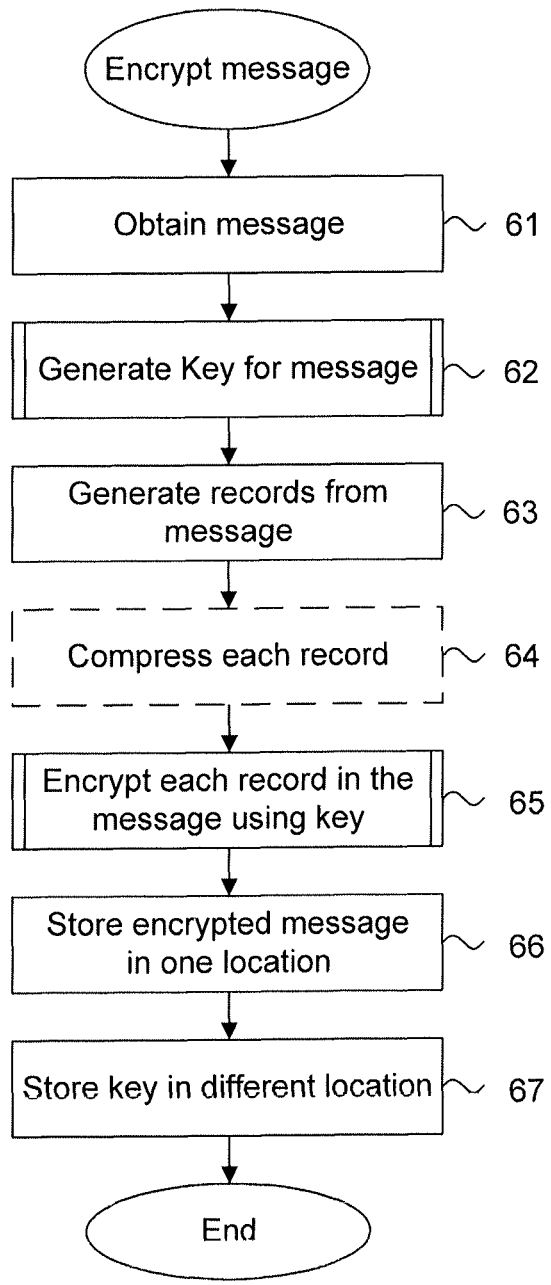
FIG. 3 is a flow diagram showing a method for individual message encryption, in accordance with one embodiment.

Once obtained, the user and agent messages can be encrypted for storing safely. The user and agent messages for a single call session can be encrypted as a single message. Alternatively, the user messages can be separated from the agent messages of a single call session and each of the user and agent messages can be separately encrypted and stored. FIG. 3 is a flow diagram showing a method for individual message encryption, in accordance with one embodiment. A plurality of messages with sensitive information is received (block 61). Each message can include text, such as text that is digitally encoded from voice utterances received during a call, text messages, and email. Other types of messages are possible, such as images. An encryption key is randomly generated for each message (block 62). Each key can be generated using a counter and time, which can be combined with seed information. The information can be a value that is provided by a machine or an individual associated with the call center. In one embodiment the seed information provided for each message can be unique. Generating encryption keys is further discussed below with reference to FIG. 4. Each message can be divided into two or more records (block 63) of predetermined length. Each record includes a portion of the message content. The amount of content included in the records is based on the predetermined length of that record. One or more of the records can optionally be compressed (block 64) to conserve storage space and provide a further barrier to a possible security breach. Encryption can occur in real time or at a later time.

Each record is encrypted (block 65) using the randomly generated key for the message from which the records originate. Alternatively, each record can be separately encrypted. Encrypting individual records is further discussed below with reference to FIG. 5. All the records associated with the message or a portion of the records can be encrypted. The encrypted portion of the records can include sensitive data, which can be located by separating a voice recording into business and user strands. The business strand corresponds with information provided by an agent at the call center, while the user strand corresponds with a caller. Prompt list candidates are identified within the business strand using a prompt list. Subsequently, the sensitive information is identified in the user strand at a location in time after the occurrence of the prompt list candidate. Identifying sensitive information is further described in commonly-owned U.S. Patent Application Publication No. 2007/0016419, published Jan. 18, 2007, which is hereby incorporated by reference. Once the records of the message are encrypted, the message is stored in a database (block 66), while the generated encryption keys are stored in a separate location (block 67), such as a key database.

Figure 4:
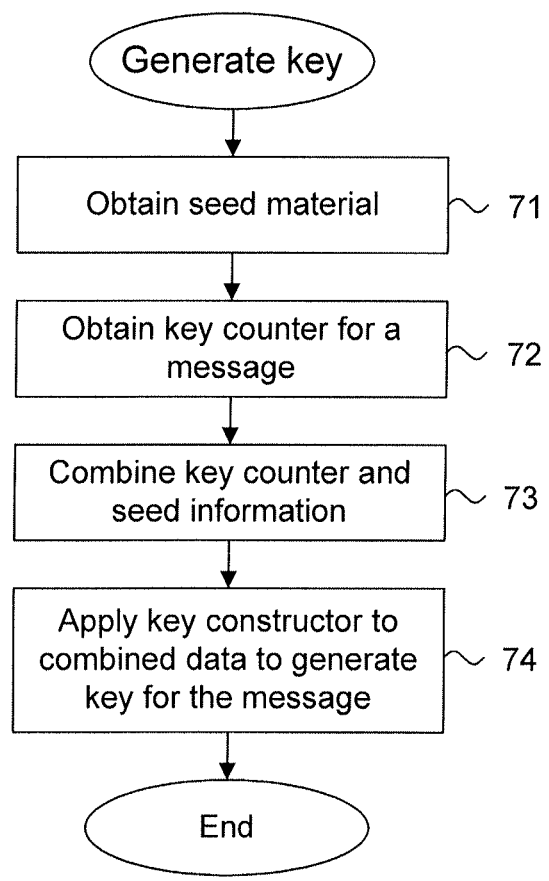
FIG. 4 is a flow diagram showing, by way of example, a method for generating random encryption keys for individual records.

To ensure that the sensitive information in each message is securely protected upon encryption, the encryption key must be random and include sufficient entropy, which is a measure of uncertainty. FIG. 4 is a flow diagram showing, by way of example, a method for generating random encryption keys for individual messages. Seed material for generating the key is obtained (block 71). The seed information can include a large random number, as well as other types of information. To prevent unauthorized access to a message, the seed material must contain sufficient entropy to generate a unique key for encrypting the message. Currently, machines can only provide a certain amount of entropy and thus, the use of two or more machines can provide more uncertainty and increase randomness of the seed information. For example, a new call enters the call center and is transmitted to the message server. In response, the message server generates entropy, which is sent to the encryption server at scheduled times, such as randomly, after every n amount of time, and after every new call. Other scheduled times are possible. The entropy from the message server is added to the entropy from the encrypted server, which is gathered locally. In a further embodiment, the entropy is generated on each machine, including by the telephony interface, network interface, or hard drive interface. Each of the machines can be selected randomly to increase the entropy.

In one embodiment, the seed information is generated for each encryption key. In a further embodiment, the seed information is generated at predetermined time periods and can be used to generate two or more encryption keys. The predetermined time period can include absolute times or time periods. In one example, the seed information can be generated every two hours.

A key counter is obtained (block 72) for a message for which the encryption key is being generated, prior to, simultaneous with or after obtaining the seed material. The key counter can start at any value and can also be incremented by any number of increments. The values and number of increments can be selected automatically or by an agent of the call center. The key counter is unique for each message. Subsequently, the key counter and seed information are combined (block 73) and a key constructor is applied to the combined data to generate an encryption key for that message (block 74). Other methods for generating an encryption key are possible.

In a further embodiment, time can also be combined with the key counter and seed information. Using the time and counter ensures that successive keys will be different from each other. For example, calls received into the call center at the same time can be used to generate different keys since the counter is included. However, when the time is different, the time adds a further level of randomness to generate the encryption key for that message.

Figure 5:
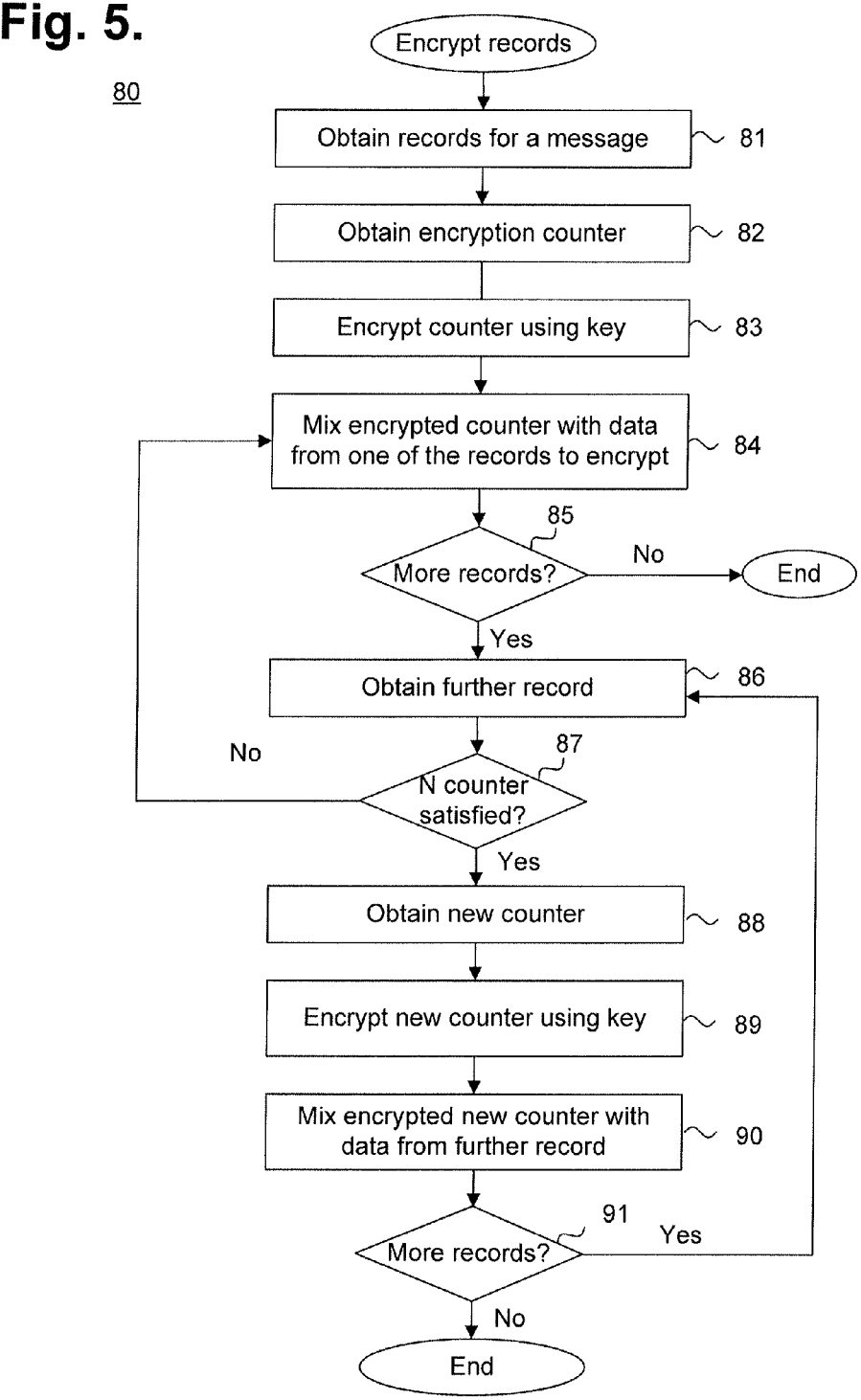
FIG. 5 is a flow diagram showing, by way of example, a method for encrypting individual records of a message.

After the encryption key has been generated, the individual records of a single message can be encrypted. FIG. 5 is a flow diagram showing, by way of example, a method 80 for encrypting individual records of a message. The records associated with a single message are obtained (block 81). An encryption counter is also obtained (block 82). The encryption counter can include a known value that can increase incrementally, such as consecutively. The encryption counter can include a numeric, alphanumeric, or a combination of numeric and alphanumeric value that increases monotonically for every record or for every n number of records. In one example, the counter can be increased after every three records. The known value and increment of the counter can be stored with the record since the encryption key is still need to access the record once encrypted.

The encryption counter is encrypted (block 83) using a unique key generated for the message, as described above with respect to FIG. 4. In a further embodiment, time can also be encrypted with the encryption counter. The time can include a time at which the call associated with the message was received into the call center, a time at which the call was handled, and a time at which the call was completed. Other times are possible. The time can be measured in hours, minutes, and seconds. In one embodiment, the time is measured by microseconds.

The encrypted counter is then mixed with data from one of the records associated with the message for encryption (block 84). Once the record is encrypted, a search for further records associated with that message is conducted (block 85). If no further records exist, the process ends. However, if further records exist, one further record is obtained for encryption (block 86). A determination is made as to whether the n number of times the encryption counter has been used is satisfied (block 87). In one embodiment, each encryption counter is used for three records before the encryption counter is changed, or increased incrementally. If not, the further record is encrypted using the current encryption counter (block 84). But, if the n number of times for the encryption counter has been satisfied, a new counter is obtained (block 88). The new counter can be determined by taking the original known value and increasing the value by the appropriate increment. The new counter is then encrypted using the encryption key for the message (block 89). The encrypted new counter is mixed with data from the further record (block 90) for encryption. Afterwards, a further search for remaining records in the message is conducted (block 91). If further records exist, that record is obtained for encryption (block 86). However, if no records exist, the message is determined to be encrypted.

Separately encrypting each message using a unique key can reduce the amount of breach associated with unauthorized access of an encryption key. For example, since each message is encrypted with a unique key, if the key is obtained without authorization, the unauthorized user is only able to access that single message, and no others. A further step of security includes storing the encryption keys in a location separate from the encrypted message.

Figure 6:
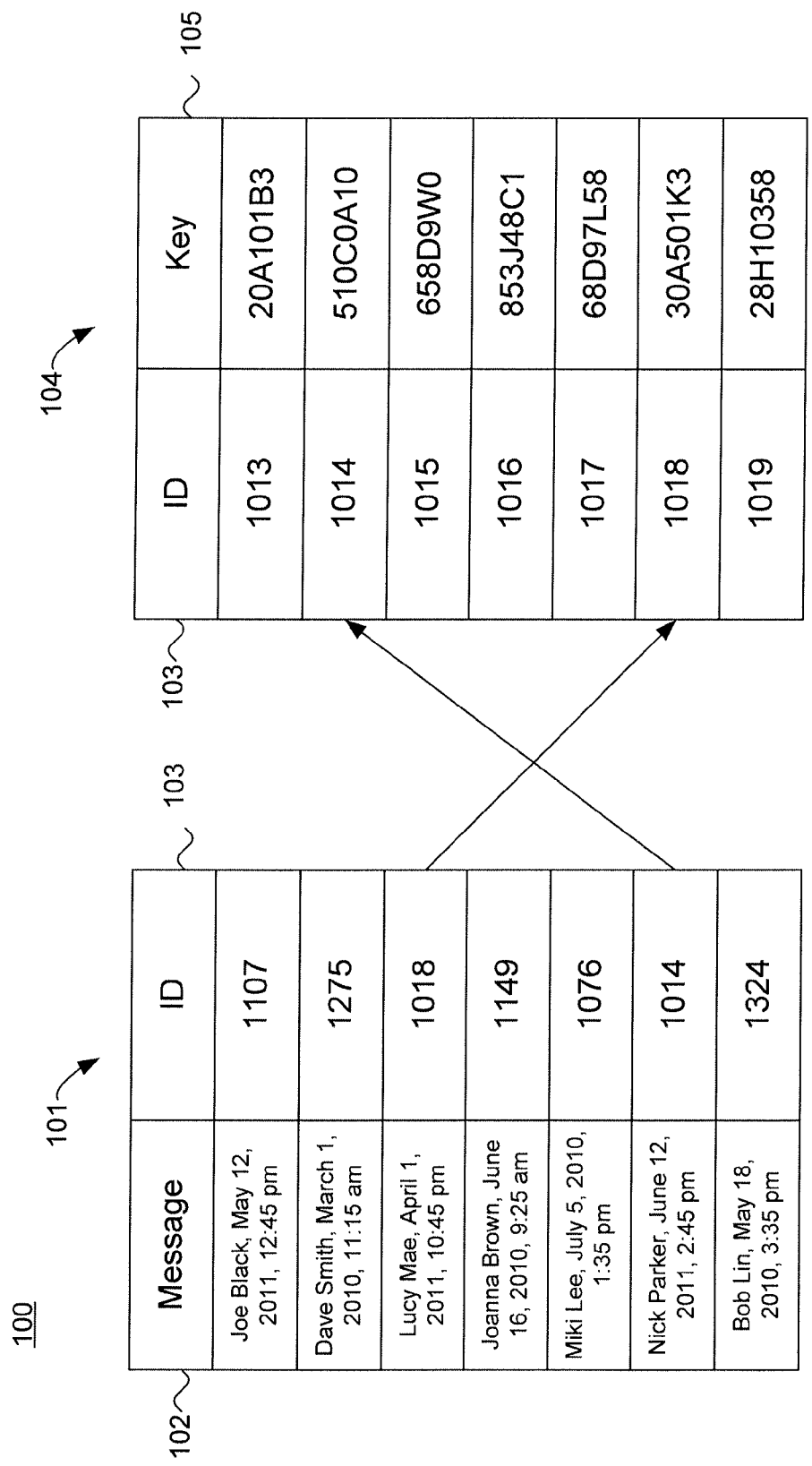
FIG. 6 is a block diagram showing, by way of example, separate indices for records and encryption keys.

To encrypt the message, the individual records for that message are each encrypted. FIG. 6 is a block diagram showing, by way of example, separate indices for encrypted messages and encryption keys. A first index 81 stores messages 82 and each of the individual records associated with the message. Each message can be identified by a name of the message, content of the message, identifier of the user sending the message, or other metadata of the message, such as the date and time of the call associated with the message. Each message 82 is associated with an identifier 83 that uniquely identifies that particular message. The identifier can be numeric, alphanumeric, or a combination of numeric and alphanumeric values. Further, in one embodiment, the identifier 83 can be assigned randomly. Each identifier 83 is associated with a message 82 and an encryption key 85 for that message. The encryption keys 85 can be stored in a separate index 84. Each encryption key 85 can be identified by a name of the key, the key itself, or other metadata.

Figure 7:
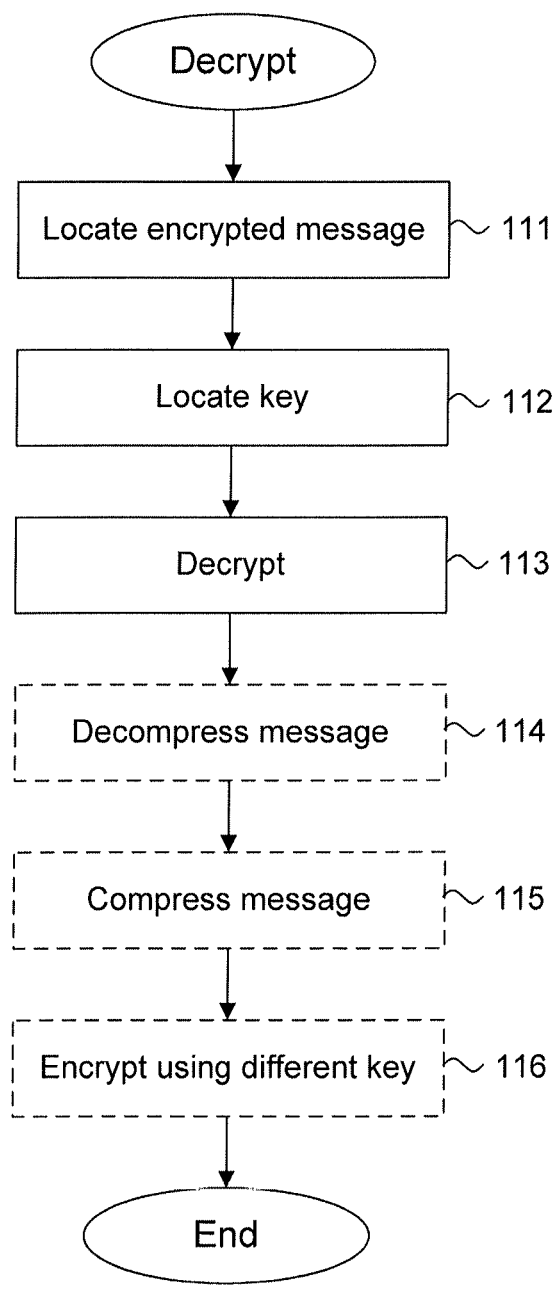
FIG. 7 is a flow diagram showing, by way of example, a method for individual message decryption.

Once a message has been encrypted, users authorized to view the encrypted message can decrypt the message for review, analysis, and processing. FIG. 7 is a flow diagram showing, by way of example, a method 90 for individual message decryption. One or more encrypted messages are located and obtained (block 91). In one embodiment, the message can be located using a reference identification number that is associated with the message and a key used to encrypt the message, as described above with reference to FIG. 5. Subsequently, the same reference number can be used to locate and obtain the encryption key (block 92). The authorized user decrypts the message (block 93) using the key and if compressed, can decompress the message (block 94).

Further, once the authorized user has finished reviewing or using the decrypted message, the message can be again encrypted. Prior to encryption, the message can be optionally compressed (block 95). Subsequently, the message is encrypted using a unique key (block 96) as described above with reference to FIG. 3. The unique key is different from the key used during the prior encryption. Thus, each encryption key is used for a single encryption of a single message.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for individual record encryption, comprising:
    a telephonic device to transmit a call to a call center; and
    a server comprising a central processing unit, memory, an input port to receive records associated with the call incoming from the telephonic device, and an output port, the central processing unit configured to:
        randomly generate for each of the records of the call a unique encryption key by receiving seed information for the unique encryption key for one such record of the call to be encrypted, obtaining a key counter unique to the one such record, and combining the seed information and unique key counter as the unique encryption key for the one such record of the call;
        uniquely encrypt the records using the encryption key generated for that record;
        associate each such encrypted record of the call and the unique encryption key for that encrypted record with an identification code; and
        store the unique encryption keys with their associated identification codes in a location separate from the encrypted records that are also stored with the associated identification codes.

2. A system according to claim 1, wherein the seed information comprises entropy from two or more servers and the key counter is one of selected by an agent and incremented by a number of two or more from a previous key counter.

3. A system according to claim 1, wherein time is encrypted with the unique encryption key.

4. A system according to claim 3, wherein the time comprises one of a time the incoming call was received, a time the incoming call was handled, and a time at which the incoming call was completed.

5. A system according to claim 1, further comprising:
    a counter module to increase the key counter during at least one of after every record and after every n records.

6. A system according to claim 1, further comprising:
    a compression module to compress one or more of the records prior to encryption.

7. A system according to claim 1, further comprising:
    a decryption module to decrypt at least one of the encrypted records, comprising:
        an identification module to determine an identification code assigned to the encrypted record; and
        a location module to locate the unique encryption key used to encrypt the encrypted record via the identification code.

8. A system according to claim 7, wherein the encryption module encrypts the decrypted record using a different unique 10 encryption key.

9. A system according to claim 1, wherein the records each comprise one of text, voice, and images.

10. A computer-implemented method for individual record encryption, comprising:
    receiving a call into a call center via at least one telephonic device;
    generating via a server a record for each of the incoming calls, wherein the server comprises a central processing unit, memory, an input port to receive the call incoming from the telephonic device, and an output port;
    randomly generating for each of the records a unique encryption key, comprising:
        receiving seed information for the unique encryption key for one such record to be encrypted;
        obtaining a key counter unique to the one such record of the call; and
        combining the seed information and unique key counter as the unique encryption key for the one such record of the call;
    uniquely encrypting the records using the unique encryption key generated for that record;
    associating each such encrypted record of the call and the unique encryption key for that encrypted record with an identification code; and
    storing the unique encryption keys with the associated identification codes in a location separate from the encrypted records that are also stored with the associated identification codes.

11. A method according to claim 10, further comprising:
    obtaining the seed information from two or more servers;
    receiving the key counter that is one of selected by an agent and incremented by a number of two or more from a previous key counter.

12. A method according to claim 10 further comprising: encrypting at least one of the key content and time with the unique encryption key.

13. A method according to claim 12, wherein the time comprises one of a time the associated incoming call was received, a time the incoming call was handled, and a time at which the incoming call was completed.

14. A method according to claim 10, further comprising: increasing the key counter during at least one of after every record and after every n records.

15. A method according to claim 10, further comprising: compressing one or more of the records prior to encryption.

16. A method according to claim 10, further comprising: decrypting at least one of the encrypted records, comprising:
   determining an identification code assigned to the encrypted record; and
   locating the unique encryption key used to encrypt the encrypted record via the identification code.

17. A method according to claim 16, further comprising: encrypting the decrypted record using a different unique encryption key.

18. A method according to claim 10, wherein the records each comprise one of text, voice, and images.

* * * * *